United States Patent [19]

Hart et al.

[11] Patent Number: 5,330,017
[45] Date of Patent: Jul. 19, 1994

[54] METHOD OF PROCESSING DRILLING MUD IN EARTH-BORING OPERATIONS

[75] Inventors: Thomas H. Hart, Lindsay; Jimmy G. Reid, Norman, both of Okla.

[73] Assignee: Profit Production, Inc., Norman, Okla.

[21] Appl. No.: 863,836

[22] Filed: Apr. 6, 1992

[51] Int. Cl.$^5$ ............................................. E21B 21/06
[52] U.S. Cl. ..................................... 175/66; 175/205; 175/207; 175/212; 210/747; 210/758; 405/128
[58] Field of Search ..................... 175/66, 68, 71, 205, 175/206, 207, 212, 208; 210/747, 758, 170, 221.2; 405/128, 129

[56] References Cited

U.S. PATENT DOCUMENTS

| | | | |
|---|---|---|---|
| 3,169,921 | 2/1965 | Griffith | 210/747 X |
| 4,136,747 | 1/1979 | Mallory et al. | 175/66 |
| 4,353,803 | 10/1982 | Dover, Jr. | 175/66 X |
| 4,449,849 | 5/1984 | Horn et al. | 405/52 |
| 4,507,208 | 3/1985 | Simon et al. | 210/721 |
| 4,564,457 | 1/1986 | Cairo, Jr. et al. | 210/704 |
| 4,668,128 | 5/1987 | Hartley et al. | 405/128 |
| 4,882,009 | 11/1989 | Santoleri et al. | 175/66 X |
| 5,133,876 | 7/1992 | Tharp | 210/758 |

FOREIGN PATENT DOCUMENTS 41354 9/1965 Fed. Rep. of Germany ........ 175/66

*Primary Examiner*—Hoang C. Dang
*Attorney, Agent, or Firm*—Hubbard, Tucker & Harris

[57] ABSTRACT

A method and associated apparatus are provided for processing the drilling mud used to flush cuttings from the bore hole while maintaining control of bore hole pressure. Air is injected into the lower regions of drilling mud in the working pits to agitate the drilling fluids and thus maintain particulate additives in suspension while simultaneously facilitating the settling of larger cuttings from the earth formations. Air is also injected into the bottom of the drilling mud and other waste fluids which are placed into the discard pit to evaporate the water and thereby accelerate consolidation or ultimate drying of the drilling mud for final disposal. This can be done as required during the drilling operation so that the consolidated or dried drilling mud can then be more easily and economically handled for transport to a hazardous waste disposal site, or can be more easily covered with earth while remaining in the discard pit.

5 Claims, 2 Drawing Sheets

METHOD OF PROCESSING DRILLING MUD IN EARTH-BORING OPERATIONS

BACKGROUND OF THE INVENTION

Conventional drilling of well-bores to find and produce hydrocarbon deposits, entails rotation of a drill bit at the end of a string of drill pipe while pumping a fluid, commonly referred to as drilling mud, down through the string of drill pipe, through the bit, then up through the annulus back to the surface. The drilling mud is used to transport the solid particulates cut from the earth back to the surface, while incidentally cooling the drill bit, and in some cases driving a motor to rotate the bit. Another important function of the drilling mud is to control bottom hole pressure, and for this reason, the specific gravity of the mud is typically increased by special high density, fine particulate additives. The drilling mud is therefore comprised primarily of water in which a very fine particulate matter is dispersed and maintained in suspension. The materials added to the drilling mud are frequently deleterious to the environment, and because of the colloidal nature of the suspension, tend to be very slow drying.

When the drilling fluids are returned to the surface, the cuttings produced by the bit are entrained in the mud and typically include particulates having a wide range of sizes. The drilling mud bearing the cuttings is normally returned by gravity to a shale shaker which screens larger particles from the fluid and then is passed through a series of metal working tanks placed above ground level before being pumped back through the drill string to the drill bit. The working pits are used to condition the mud for return to the bore hole. A major portion of the cuttings which are not screened by the shale shaker are allowed to settle to the bottom of the first pit. This process is facilitated by a series of mechanical stirring devices which attempt to maintain the very fine particles in the drilling fluid sufficiently stirred to keep the particles in suspension while simultaneously facilitating the settlement by gravity of the larger cuttings from the borehole. As many working pits as required are used for separation and to maintain a sufficient volumetric reserve of drilling fluids for the drilling operations. Various materials are added to the muds such as high specific gravity particulates, chemicals or the like, typically added to the last working pit or suction pit prior to the mud pumps. It is also frequently necessary to add water to maintain a mud having an appropriate viscosity.

As part of the preparation for drilling the well, a reserve pit is normally formed in the surface of the earth using a bulldozer to scrape the earth down to the desired depth with the dirt piled at one end so the dirt can be conveniently used to recover the pit when the well is completed. During the drilling operations, the particulate materials screened by the shale shaker are transferred to the reserve mud pit, and the cuttings which settle from the mud in the working pits are periodically flushed out during periods when mud circulation is interpreted during normal operations. The material flushed from these pits is also directed to the earthen mud pit, as well as any drilling fluid which, for one reason or another, is deemed inappropriate for further drilling operations. Ultimately, all drilling fluids used in the operation are typically placed in the mud pit. Since in the process of finding the hydrocarbons, a certain amount of hydrocarbons are invariably entrained in the mud, and ultimately deposited in the mud pit, as well as excess cement from the well completion process, the mud pit commonly includes hazardous waste material which must be dealt with by either providing a pit lined with a long-lasting impervious material, or the mud must be pumped from the working pits and/or reserve pit into transports and then hauled to a suitable waste disposal site.

The mechanical stirring devices used to agitate the drilling fluid in the working pits require substantial power to operate, are somewhat complex and expensive to construct, and require substantial maintenance. Additionally, it is very difficult for these devices to provide uniform agitation within the pits and is common for dead spots to exist which result in settling and accumulating the fine particles from the drilling fluid. The result is that an excessive preparation of the expensive fine particulate additives used to enhance specific gravity are lost as sediments in the bottoms of the working tanks and are flushed to the earthen pit and expensive additives must be replaced to maintain the desired mud weight.

When the drilling fluid is ultimately disposed of, the historical approach was to leave the drilling fluid in the open pit to dry by natural evaporation. This typically took a substantial period of time during which there was danger of cattle or other animals wandering into the pit and perishing. Eventually, a bulldozer was used to push the dirt originally removed from the pit over the dried material and return the surface as nearly as possible to its original condition. If this process was attempted before the drilling mud had adequately dried, the bulldozer was at risk of becoming mired in the wet drilling mud. Sometimes the dry soil displaced excessively wet drilling mud to the surface causing significant problems. In more recent times, environmental concerns have resulted in drilling pits being lined with zippered or otherwise seamed plastic sheets to prevent migration of the oils and chemicals into the ground water. This has further complicated the covering process because of the danger of the bulldozer puncturing the lining. In some instances, environmental concerns have resulted in the material being accumulated and trucked away in the fluid or semi-fluid state to an approved disposal site.

BRIEF DESCRIPTION OF THE INVENTION

The present invention is concerned with method and apparatus for processing the drilling fluid in the working pits during the drilling operation, and for drying the drilling fluid in the earthen pit at a substantially accelerated rate. In accordance with the present invention, each of these objectives is accomplished by bubbling air upwardly through the drilling fluid. Both of these methods can be achieved by substantially the same system utilizing a conventional diesel driven air blower and appropriate manifolding. A heat exchanger may be included to heat the air being used to dry the drilling fluid in the disposal pit. The bubbling of air through the relatively small working pits is accomplished by any suitable manifold which distributes the air through a series of small apertures, preferably uniformly spaced over the bottom of the working pit. A throttling valve is preferably provided to control the flow of air into the manifold and distribution system so that the volume of air can be selectively controlled to provide the desired level of uniform agitation of the drilling fluid such as to maintain the very fine particulates which constitute a portion of the drilling fluid in suspension, while simultaneously promoting the settling by gravity of the larger cuttings which must be separated. Minimal loss of water results from the agitation because the fluid mud is continuously passing through the working pit.

As compared to mechanical agitation, the present invention provides greater and even agitation over the area of the pit to keep the pit moving and eliminate dead areas in which undesired settling occurs. By accelerating removal of the cuttings, the mud weight is maintained at the desired level, reducing the need to add water, and thus the need to add chemicals or other additives to maintain the mud system. This further reduces the amount of waste fluids to be dumped or jetted into the reserve pit. The apparatus requires less horse power to operate, is less expensive to fabricate, requires less set up time because the hydraulic pump lines and other drive mechanisms for the mechanical stirs are eliminated.

Air is also bubbled up through the fluids in the reserve pit for the purpose of evaporating the water to either reduce the volume or completely dry the mud for ultimate disposal. Importantly, this is accomplished at all times during the drilling operation to greatly reduce the time at which the pit can be finally closed. By drying the material during operation at an accelerated rate, a smaller pit is required, thereby reducing the surface area needed, requiring less excavation and subsequent refilling, thereby reducing the cost. If the pit is in a location which requires lining for environmental reasons, the smaller pit reduces the lining cost. The residue produced by the present method is more uniformly dried than merely exposing the surface to the atmosphere, and is more completely dried, thus reducing ground settling after final fill. The residue is also firmer and more easily covered over, thus reducing the risk to the bulldozer and to any liner that may be in the pit as a result of the bulldozer sinking into the liner. In most instances, the method of the present invention reduces or eliminates the need to truck fluids to offsite disposal pit, thus decreasing cost as well as reducing truck traffic.

These and other advantages of the present invention will be apparent to those skilled in the art from the following detailed description and drawings wherein:

DETAILED DESCRIPTION OF THE DRAWINGS

Figure 1:
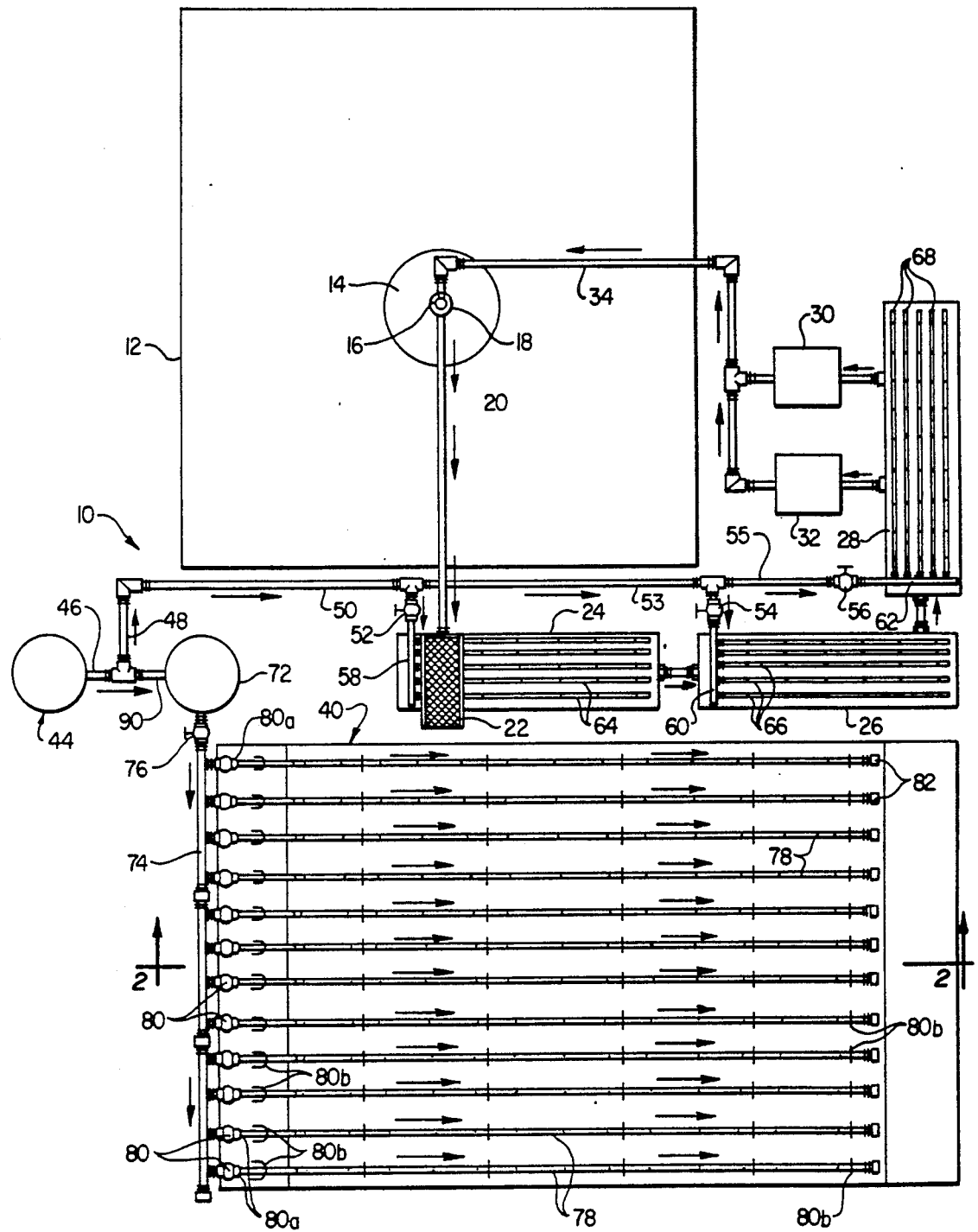
FIG. 1 is a schematic plan view of a drilling mud system in accordance with the present invention for carrying out the methods of processing the drilling mud of the present invention.
Figure 2:
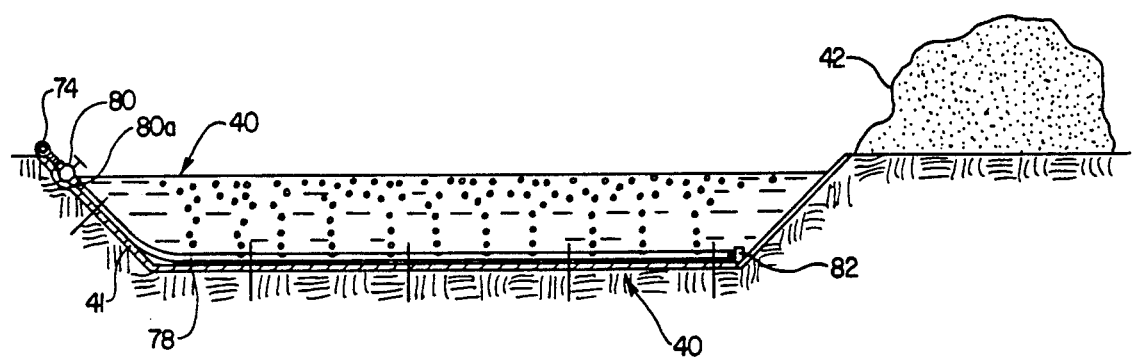
FIG. 2 is a sectional view taken substantially on lines 2—2 of FIG. 1.
Figure 3:
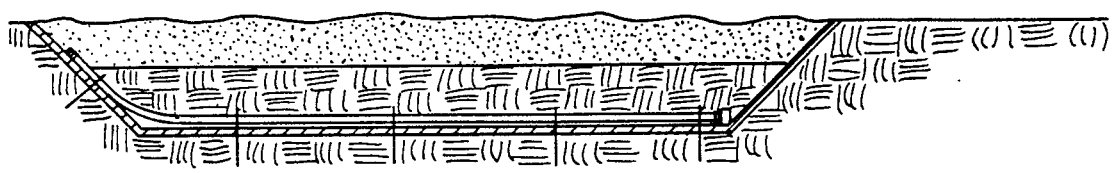
FIG. 3 is a sectional view similar to FIG. 2 illustrating the completion of the method in accordance with the present invention.
Figure 4:
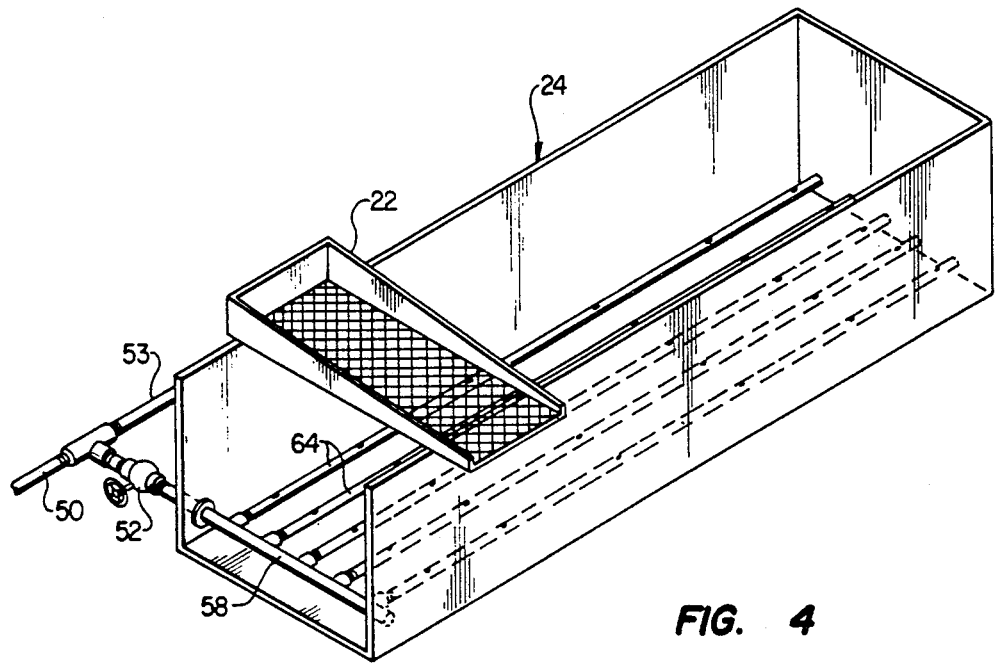
FIG. 4 is a somewhat schematic isometric view of a working mud pit illustrated in FIG. 1, with an end wall removed for purposes of illustration.

Referring now to the drawings, and in particular to FIG. 1, a mud circulating system constructed in accordance with the present invention for carrying out the method of the present invention is illustrated generally by the reference numeral 10.

A conventional drilling rig, indicated generally by the reference numeral 12, having a rotary table schematically represented at 14, a drill string represented at 16, and a casing represented at 18. The mud circulation system 10 includes a conduit 20 which returns flow from the casing 18 to a shale shaker 22 and thus to a first working pit 24. The fluid flows from the pit 24 to a second working pit 26, and finally to a suction pit 28. Additional working pits may be provided as necessary, depending upon the depth of the well being drilled and other factors. Drilling mud is withdrawn from pit 28 by conventional mud pumps 30 and 32 and conveyed through conduit 34 to the drill string 16. This arrangement of mud circulation equipment is conventional in the art, and numerous conventional variations in this type of equipment can be employed.

The working pits 24 and 26 are typically disposed adjacent an earthen reserve pit 40 which is dug in the surface of the earth typically by means of a bulldozer. The reserve pit 40 varies in size, depending on the depth of the well bore and the anticipated quantity of drilling fluid required, but for convenience is generally rectangularly shaped and is formed by making a series of passes with the bulldozer from left to right which results in a pile of dirt 42 at one edge of the pit. The reesrve pit 40 may be lined with a suitable conventional plastic liner when required by the particular well location.

In accordance with the novel aspects of the present invention, a source of air under pressure, typically an airblower driven by a diesel engine, is illustrated schematically and indicated by the reference numeral 44. The unit 44 can be a high volume, low pressure unit operating, for example, at 20 psi and conveying as much as 1600 cubic feet per minute. This can be achieved utilizing a 175 hp diesel engine.

The source of air 44 provides a volume of air under pressure to a conduit 46 which is fed through conduits 48, 50, 53 and 55, and valves 52, 54 and 56 to headers 58, 60 and 62, associated with pits 24, 26 and 28, respectively. Each of the headers 58, 60 and 62 are connected to sets of parallel conduits 64, 66 and 68, respectively. The conduit 64, 66 and 68 are perforated at uniform intervals, the spacing between the conduits and the perforations being such as to provide generally uniformed dispersion of air bubbles over the areas of the respective working pits.

The conduits 64, 66 and 68 may be metal and permanently mounted in the respective pits, or any other suitable means may be provided to direct air under pressure to a similar array of orifices from which air may be introduced to the bottom of the volume of drilling fluid in a uniform manner such that the air will rise by gravity and uniformly agitate the mud to a degree sufficient to maintain it uniformly mixed.

The conduit 46 is also connected by way of conduit 70 to an air heater 72, which may be of any suitable type, which in turn feeds heated air through a header 74 associated with the reserve pit 40 by way of valve 76 to accelerate the rate at which the mud can be dried. Each of a plurality of parallel flexible conduits 78 are connected to the header 74 by a valve 80 and preferably a quick disconnect couplings 80a, so that the header can be moved from well location to well location while leaving the conduits under the dried and buried mud as presently described. Each of the conduits 78 are capped or otherwise closed at the distal ends 82 and are perforated at intervals corresponding generally to the spacing between the conduits. For example, the flexible conduits 78 may be 1" diameter PVC pipe placed on one-foot spacings with ⅛" perforations at one-foot intervals. The flexible conduits 78 are preferably sufficiently flexible to follow the contours of the bottom reserve pit 40, and may be weighted, internally or externally, or secured in place by U-shaped staples 80b, as required to keep the pipes in place under the drilling mud when idled with air which tends to cause the conduits to float.

If desired, the bottom of the reserve pit 40 may be sloped in a direction transverse to the extension of the conduits 78 so that the drying operation may start before the pit is completely filled, and thus earlier in the disposal process. In such a case, only selected ones of the valves 80 at the lowest level of the bottom of the pit may be opened so that air will issue only from conduits that are covered with fluid mud even though there is not sufficient mud to cover the entire bottom of the pit. The valves to successive conduits can then be opened as the conduits are covered by additional mud added to the pit.

In carrying out the method of the present invention, air is injected, preferably uniformly, into the lower portion of the volume of drilling mud standing in any one of the mud pits 24, 26, 28 or 40 to process the drilling fluid. When air is injected into the drilling mud, the drilling fluid is agitated to a substantial degree, depending upon the volume of air being forced through the array of apertures, and the spacing of the array of apertures, as the air bubbles rise due to gravity through the mud. In general, the agitation of the mud results in the fine particles which have been added to the water to produce a drilling mud of the desired density to tend to be maintained in suspension as if being mechanically stirred. It is believed that this result is because of the very fine particle size which tends to remain in a colloidal suspension. The cuttings, on the other hand, which tend to be significantly larger in size and of higher density, tend to settle out more rapidly. It is believed that this is similar in effect to vibrations induced in viscous fluids which permit the particles to migrate more easily and fall due to gravity even though at times they are being carried upwardly by air bubbles. This phenomena can be used to significant advantage in the working pits 24, 26 and 28 by eliminating the need for mechanically stirring the mud to maintain the colloidal suspension, and provides significantly improved uniformity of stirring. The degree of agitation and stirring can be selected by controlling the respective valves 52, 54 or 56 leading to the headers 58, 60 and 62, respectively, of the various working pits. The use of the process in connection with the working pits prevents the loss of the expensive particulate solids added to the mud to achieve its desired density or other special characteristic, thus reducing the cost of replacing these additives to maintain the desired mud condition, and reduces the quantity of additives which needs to be flushed from the working pits to the reserve pit and thus finally disposed of. Although the air bubbling through the mud in the working tanks does tend to cause some accelerated evaporation of the fluid, compared to no agitation, the increased loss of liquid water is not excessive when compared to that produced by the mechanical agitation. This is perhaps because of the continuous flow of the mud through the working pits during the drilling operations.

When the method of the present invention is applied to the processing of the drilling mud in the reserve pit for final disposal, the air is preferably passed through the heater 72, so that it is at a more elevated temperature at the time it is introduced uniformly under the mud standing in the reserve pit 40. As a result, when the hotter air is bubbled up generally uniformly through the mud which is to be processed for final disposal, the mud is agitated to again tend to maintain the colloidal suspension of the fine additive particulates while accelerating the settling of the larger, more dense, particulate cuttings. As a result, the water in the mud is evaporated more uniformly because of the agitation and at an accelerated rate because of contact with a significantly higher volume of air and preferably heated air. An important aspect of this process is that the mud in the reserve pit 40 is prevented from developing a dried crust at the surface which occurs in a non-agitated environment typically used in the prior art. As a result, the water is not trapped beneath a dried, generally impenetrable crust at the surface. Also a substantially uniformly dried and consolidated mud is produced from top to bottom of the pit because the mud continues to be agitated by air bubbles until very thick.

As a result of the consolidation of the drilling mud in the reserve pit using this method, a number of alternative, advantageous options are available to the user for final disposition of the condensed and/or dried mud. The consolidation of the mud can be initiated at any time during the process of drilling the well, and the ultimate disposal of the material is also optional. If the material must be transported to an off-location disposal site for hazardous waste, the quantity of material can be significantly reduced, and can be transported as a condensed pumpable liquid or as an essentially dry bulk particulate form. Alternatively, the material can substantially dried in place so that it can be covered upon completion of the well by means of a bulldozer with minimal risk of breaking through the crust or even affecting the liner of the pit, and will minimize the amount of longterm settling. In any event, the total rime required to process the drilling mud for final disposal can be greatly reduced by the accelerated evaporation due to the air, especially if heated, and due to the fact that this process can be initiated as early as desired in the well drilling process.

Although preferred embodiments of the invention have been described in detail, it should be understood that various changes, substitutions and alterations can be made therein without departing from the spirit and scope of the invention as defined by the appended claims.

What is claimed is:

1. A method for treating drilling fluids used in a process of drilling a borehole in the earth to recover hydrocarbons, the drilling fluid including water and particulate material characterizing the drilling fluid for a particular application, comprising:
   collecting the drilling fluid in a discard pit formed in the surface of the earth;
   injecting gas into the collected drilling fluid in a pattern such as to cause agitation of the fluid until it is significantly dried to facilitate final disposal; and
   covering the dried material with earth.

2. The method of claim 1 wherein the discard pit is lined with a fluid impenetrable liner before collection of the drilling fluid.

3. The method of claim 1 wherein the gas is injected through an array of conduits disposed on the bottom of the discard pit and having a generally uniformly spaced array of apertures opening into the collected drilling fluid.

4. The method of claim 3 wherein the array of conduits is left within the dried drilling fluid when the drilling fluid is covered with earth.

5. A method for treating drilling fluids used in a process of drilling a borehole in the earth to recover hydrocarbons, the drilling fluid including water and particulate material for characterizing the drilling fluid for a particular application, comprising:

withdrawing said drilling fluid from a borehole, said drilling fluid having cuttings suspended therein;

collecting a volume of said fluid having cuttings suspended therein in a discard pit;

heating a gas; and injecting said heated gas into the collected volume of the drilling fluid until the drilling fluid is significantly dried to facilitate final disposal, said heated gas injected in a pattern such as to cause agitation of the fluid to maintain said particulate material in colloidal suspension while allowing cuttings to settle.

* * * * *